United States Patent [19]
Long et al.

[11] 3,916,054

[45] Oct. 28, 1975

[54] COMPLIANT STRUCTURAL MEMBERS

[75] Inventors: John V. Long, El Cajon; George D. Cremer, Lemon Grove, both of Calif.

[73] Assignee: International Harvester Company, San Diego, Calif.

[22] Filed: Feb. 23, 1973

[21] Appl. No.: 335,320

[52] U.S. Cl. .......... 428/117; 29/455 LM; 29/471.3; 113/116 H; 277/96 R; 277/236; 428/116; 428/156; 428/185; 428/186; 428/192; 428/193; 428/256
[51] Int. Cl.² .... B32B 3/12; B32B 3/28; F16J 15/34
[58] Field of Search ....... 161/55, 60, 125, 132, 133, 161/135, 137, 151, 213, 68; 113/116 H, 116 Z, 118 D, 120 W; 277/96 A, 96 R, 236; 29/455 LM, 471.3

[56] References Cited
UNITED STATES PATENTS

| | | | |
|---|---|---|---|
| 2,576,698 | 11/1951 | Russum | 161/133 X |
| 3,037,592 | 6/1962 | Shipley et al. | 161/136 X |
| 3,341,102 | 9/1967 | Stephens et al. | 161/137 X |
| 3,341,395 | 9/1967 | Weber | 161/133 X |
| 3,458,977 | 8/1969 | Young et al. | 161/137 X |
| 3,544,417 | 12/1970 | Corzine | 161/137 X |
| 3,748,213 | 7/1973 | Kitching et al. | 161/137 X |
| 3,814,208 | 6/1974 | Morresi et al. | 161/133 X |

*Primary Examiner*—George F. Lesmes
*Assistant Examiner*—Alan T. McDonald
*Attorney, Agent, or Firm*—Strauch, Nolan, Neale, Nies & Kurz

[57] ABSTRACT

Lightweight, porous, compliant structural members comprising an assemblage of metallic strips disposed in side-by-side relationship with the edges of the strips at opposite sides of the assemblage. There are interstices between the strips, and the edges of the strips are fixed relative to each other on at least one side of the assemblage to maintain the strips in the proper relationship.

23 Claims, 15 Drawing Figures

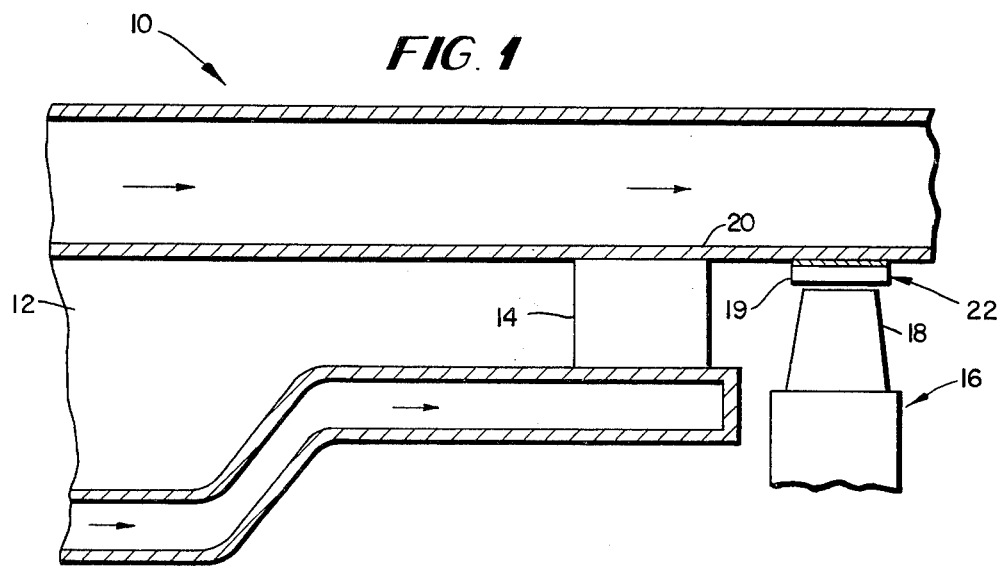
FIG. 1
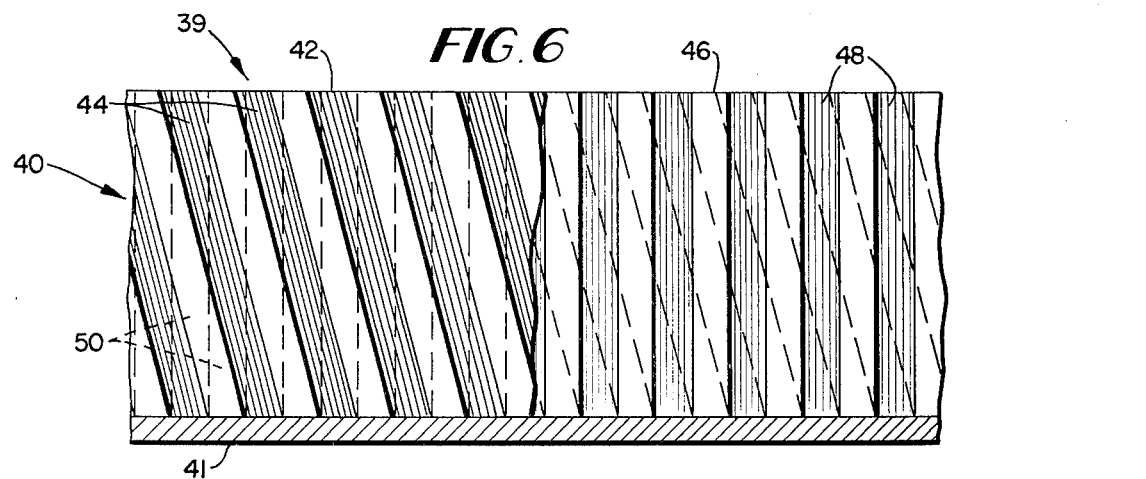
FIG. 6
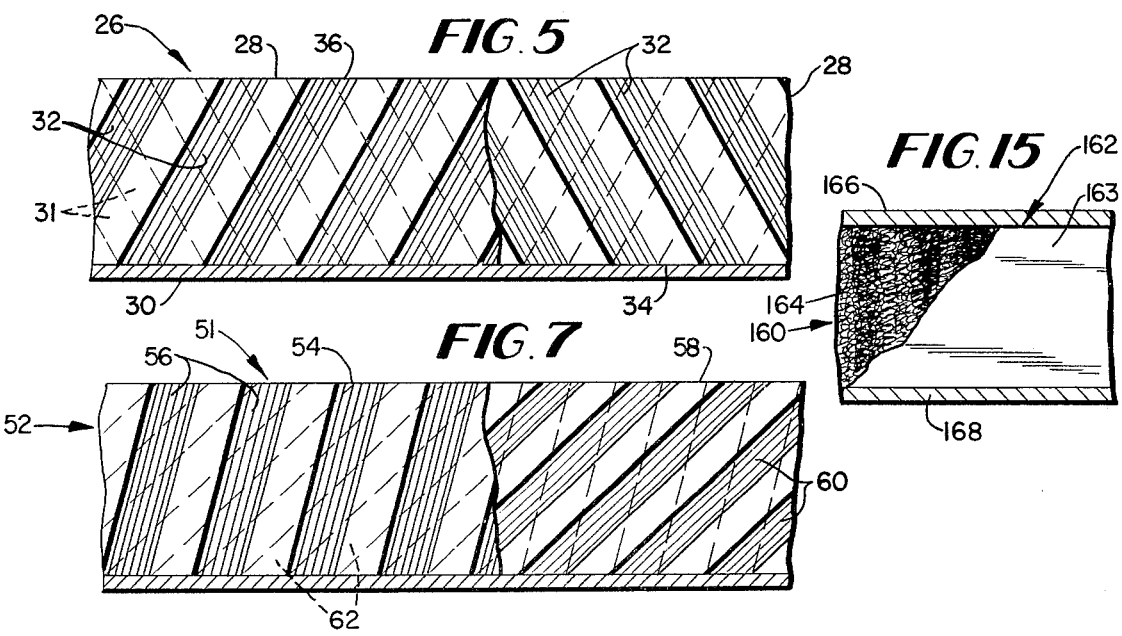
FIG. 5
FIG. 15
FIG. 7

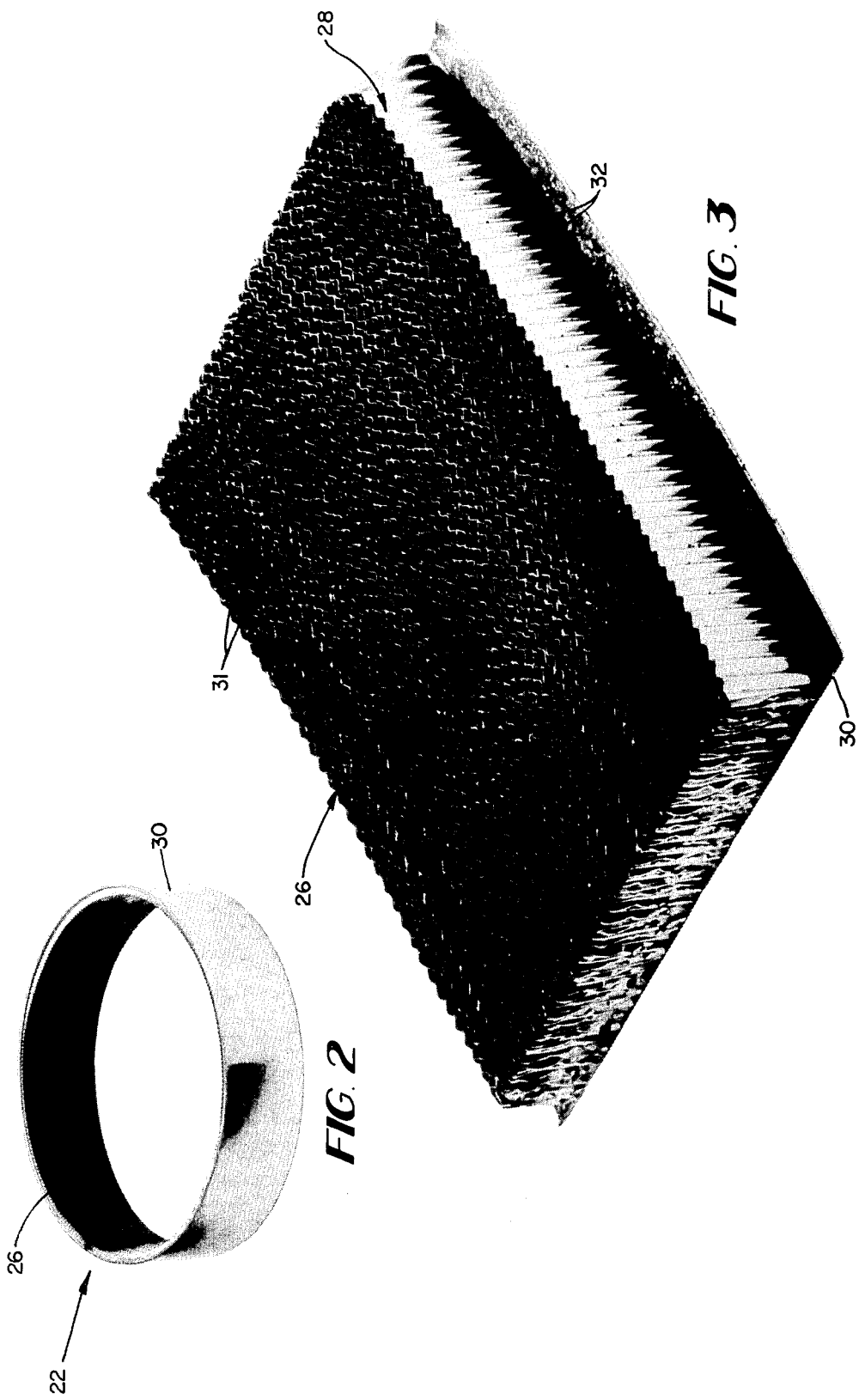

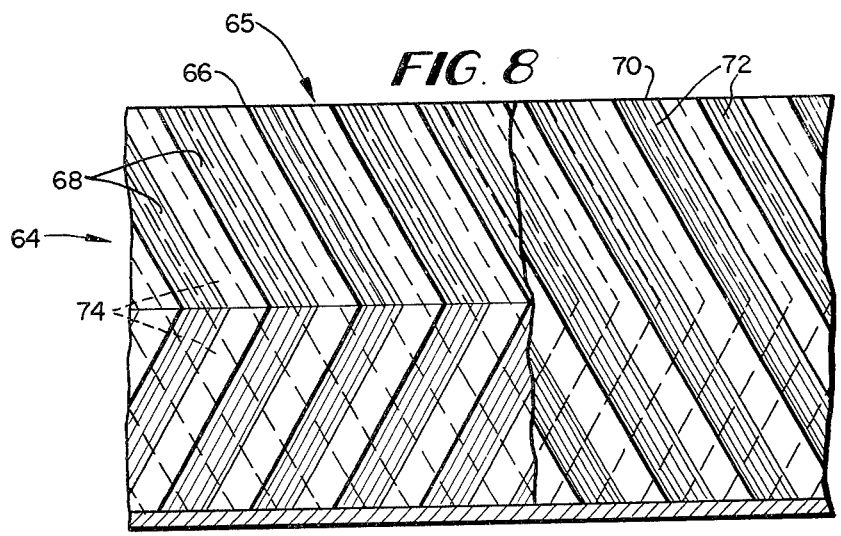
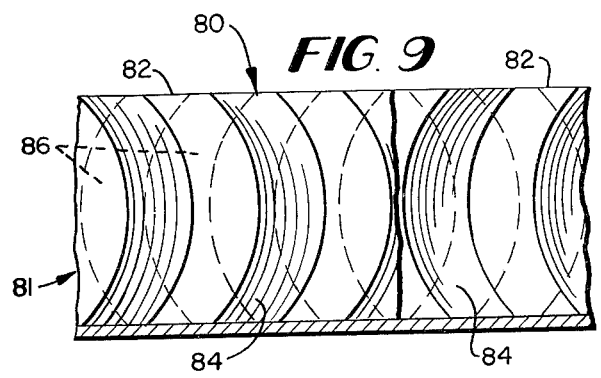
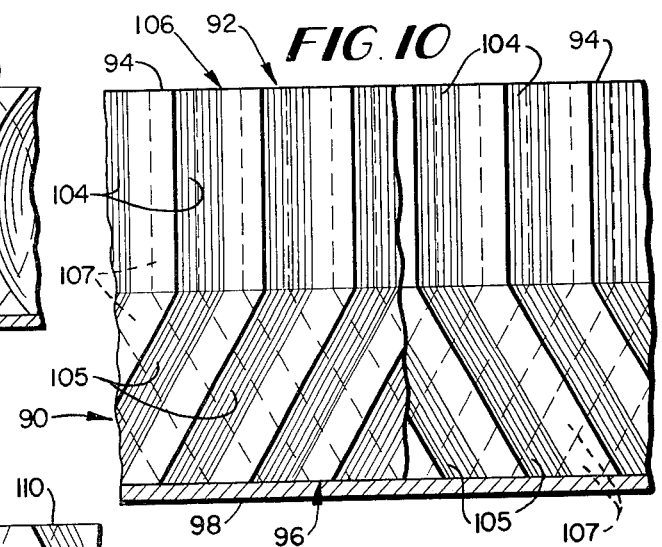
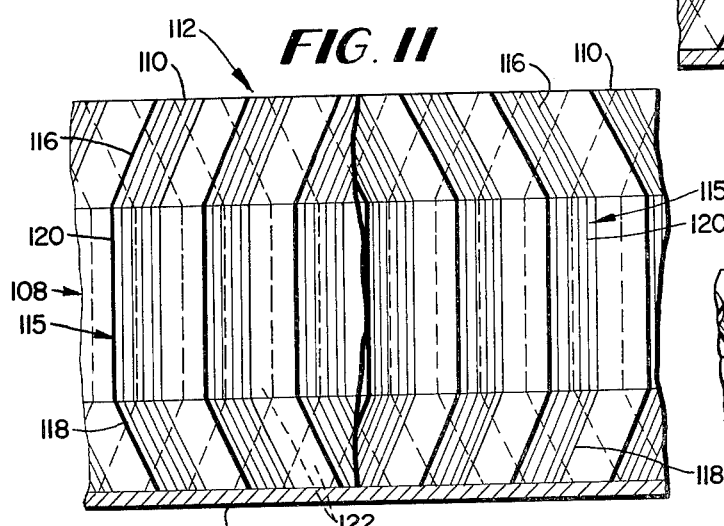
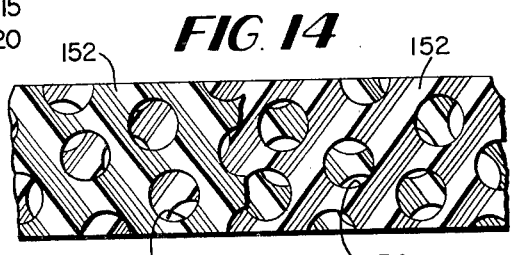
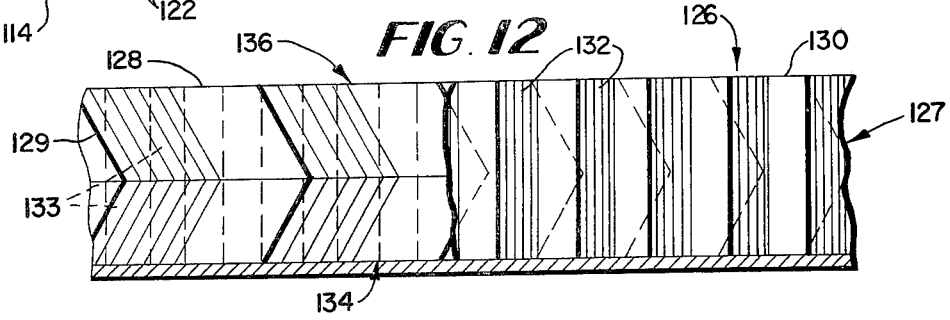

COMPLIANT STRUCTURAL MEMBERS

This invention relates to novel, improved, lightweight, porous, strong, stable, durable members which are useful for a variety of purposes which will be readily apparent from the disclosure herein and in the accompanying drawing to those persons skilled in the arts to which the invention relates.

At the present time turbine and compressor rub rings and labyrinth seals are particularly important uses to which the novel members of the present invention may be put. The principles of the invention and its features and advantages will be developed primarily by reference to these particular applications of it. It is to be understood, however, that this is for the sake of clarity and the reader's convenience and is not intended to limit the scope of the invention.

In both the compressor and turbine sections of turbine engines and in other machines as well, a rotor (or wheel or fan) consisting of a central shaft carrying one or more rows of radially extending blades rotates in a cooperating, stationary housing or shroud surrounding the rotor. Typically, the rotor reaches an elevated temperature during operation; and a considerable clearance must be left between the blade tips and the housing or shroud to accommodate differential expansion between the rotating and stationary components of the machine.

If sufficient clearance to accommodate thermal expansion is provided, the air or other gas in the housing can be pumped past the tips of the rotor blades in significant quantities, substantially reducing the efficiency of the machine.

Accordingly, a number of schemes for preventing gas flow between the tips of the rotor blades and the stationary structure in which the rotor revolves during operation of the machine have been proposed.

One of the first proposals involved the use of squealers[1] on the rotor blades to produce a rubbing type seal with a limited area of contact between the blade tips and the surrounding stationary structure. Squealers have obvious drawbacks and were replaced by seals fabricated from open-faced honeycomb type materials.[2]

[1] A squealer is a blade tip thinned to rub against the surrounding structure and provide a seal with a minimum of heating.

[2] Examples of such seals are disclosed in U.S. Pat. Nos. 2,963,307 issued Dec. 6, 1960 to Bobo for HONEYCOMB SEAL and U.S. Pat. No. 3,056,853 issued Oct. 2, 1962 to Varadi for RETAINING MEANS FOR TURBINE SHROUDS AND NOZZLE DIAPHRAGMS OF TURBINE ENGINES.

While an improvement on squealers, honeycomb seals also proved to have a number of disadvantages. Honeycomb materials with small cell sizes are expensive. Also, such honeycomb structures are relatively stiff. Stiffness, coupled with the relatively large area of contact which occurs when small cell sizes are employed, produces considerable friction between the blade tips and the seal. The result is excessive wear of the blade tips and detrimental overheating of the seal.

If large cell sizes are used in order to reduce the contact area and eliminate excessive friction, the cell sizes become so large that axial flow or pumping of the gases across the rotor blade tips occurs; and this is the very phenomenom which is to be eliminated, attenuated or avoided, if possible.[3]

[3] An even less satisfactory arrangement than that of the honeycomb type from the point-of-view of rubbing friction, high cost, inability to prevent axial flow, and other of the drawbacks discussed above, would be the unitary, grid-type material described in U.S. Pat. No. 3,042,365 issued July 3, 1962 to Curtis for BLADE SHROUDING. Also, disadvantages common to all honeycomb type seals such as high cost, stiffness, and difficulty in forming the strips from which the honeycomb structure is made remain.

To take advantage of the reduction in rubbing friction which can be obtained by employing larger cell sizes and yet avoid flow past the blade tips, it has been proposed that the cells of honeycomb seals be filled with an abradable, heat resistant material. Exemplary seals of this character are described in U.S. Pat. Nos. 3,053,694 issued Sept. 11, 1962 to Daunt for ABRADABLE MATERIAL; U.S. Pat. No. 3,068,016 issued Dec. 11, 1962, to Dega for HIGH TEMPERATURE SEAL; and U.S. Pat. No. 3,126,149 issued Mar. 24, 1964 to Bowers for FOAMED ALUMINUM HONEYCOMB ROTOR RUB-IN SHROUD. Although axial gas flow past the rotor tips is reduced in filled honeycomb materials, the other disadvantages of honeycomb type seals, some of which are discussed above, are not eliminated. In addition, difficulties can be experienced in retaining the filler material in the honeycomb matrix.[4]

[4] A seal of a "filled" material which would be inferior to that of the type just described is disclosed in U.S. Pat. No. 3,092,306 issued June 4, 1963 to Eder for ABRADABLE PROTECTIVE COATING FOR COMPRESSOR CASINGS. The Eder coating would be even stiffer than a honeycomb structure and would have a greater area of rubbing contact. It would be expensive to install and to replace and would have other drawbacks as well.

Another type of heretofore developed sealing arrangement for applications of the type in question is made of felted metal fibers or metal fibers sintered into a mat. Like those of honeycomb type construction, seals of this type have a number of disadvantages. The fibers used for this purpose have small diameters and, consequently, large surface areas. They are therefore highly susceptible to oxidation and, indeed, suitable only for applications where the temperature does not exceed about 1200° F., even when the most oxidation resistant materials are employed, as oxidation rates become catastrophic at higher temperatures.

Furthermore, such material is not self-supporting and must accordingly be attached to a backing member or support. In the process of welding or brazing the felted material to the backing member, the brazing alloy or weld metal typically fills the interstices between the fibers by virtue of capillary flow. This significantly degrades the compliance and abradable characteristics of the material, characteristics which are highly desirable for the uses described herein.

Also, seals of this character generally have low strength. Further, they also lack the durability needed to withstand periodic engine cleaning.

Still another type of seal for minimizing axial leakage in turbines and the like is disclosed in U.S. Pat. No. 3,092,393 issued June 4, 1963, to Morley for LABYRINTH SEALS. The Morley seals consist of a stack or series of annular metal strips which are attached to the stationary component of the machine in which the seal is installed and are spaced apart at the surface of the assemblage where contacted by the associated rotating component of the machine. The annular members are made of a material which is softer or has a lower melting point than the rotating component of the machine in which the seal is installed so that they will wear away where contacted by the rotating component.

The Morley seal is nothing more than a modification or extension of a conventional labyrinth seal and would have much the same disadvantages of the latter. Specifically, because of its construction, the strips forming the Morley seal would have to be relatively stiff and non-resilient. As a result, they would be expected to have a low degree of compliance and would not be capable of maintaining an effective seal, particularly in circumstances involving significant temperature changes or temperature differentials which produce expansion and contraction of the metal structures accompanying such thermal changes. In addition, the Morley structures would not be effective seals because of the large spaces between the strips and, in this regard, would be less efficient than honeycomb seals which, as discussed above, have not proven totally satisfactory as they are required to be modified as by filling the pores with an abradable material.

We have now developed a novel, lightweight, porous, durable, stable material which can be employed to make seals that are free of the disadvantages of those discussed above and which provide superior sealing for compressors, turbines, and similar machines in addition to structures which are useful for many other purposes.

In brief, our novel structures or materials consist of an assemblage of metallic foils or strips disposed in side-by-side relationship with the edges of the foils at opposite sides of the assemblage and with the edges of the strips at one side of the assemblage bonded together or otherwise fixed relative to each other. This may and typically will be accomplished by bonding a support or backing member to the edges of the strips on one side of the assemblage.

Part or all of the strips are corrugated or otherwise embossed. The corrugations are formed and the adjacent strips positioned in such a manner as to prevent nesting[5,6] and to create interstices between the strips while limiting the pore area at the surface of the structure defined by the exposed edges of the corrugated strips. It has been found, for example, that surfaces which are 70–95% sealed and which have pore sizes as small as 0.0005 to 0.010 inch can readily be obtained.

[5] "Nesting" is used herein to identify the condition in which one strip contacts an adjacent strip or strips over a substantial area and thereby eliminates interstices between the strips to a significant extent.

[6] Nesting can also be avoided by using felted, knitted, or similar materials between the strips, if desired.

Also, because of the pore configuration, the novel structures we have invented keep the bonding metal in its liquid state from flowing by means of capillary action or "wicking" through the assemblage of strips when the support or backing member is attached. This eliminates the adverse changes in abradability attributable to the presence of the relatively solid-surfaced bonding metals as well as the accompanying, unwelcome increase in the thermal conductivity of the structure.

Due primarily to the unique interstitial configurations which can be provided, structures formed in accord with the principles of the present invention also afford superior components of the filled type because of the tenacity with which the filler material is retained in place by the corrugated or embossed metal foil strips.

Also, again because of the unique interstitial arrangements, essentially all convective gas flows in the foil assemblages of our novel structures are eliminated. As a result, in high temperature applications the structures of the present invention as well as the components in which they are mounted remain cooler than when prior art assemblages such as those described above are employed.

In addition to having limited pore areas, the novel structures described hereinbefore are self-supporting. Further, they possess a high degree of compliance in applications where they are rubbed by rotor blade tips and ribbed structures. For example, they will readily adjust to a zero tolerance fit with the contacting surface of the blade or other relatively movable member by abrading, folding, bending, smearing, fraying, and/or by elastic displacement and compression of the foils.[7,8] At the same time, they do not exhibit significant anticlastic effects; that is, they can be bent or curved in one direction without incurring damaging distortion in directions normal to the bend.

[7] Because of their high compliance, the novel structures of the present invention will also accommodate a considerable amount of misalignment between the components spanned by them.

[8] To minimize friction, anti-gall or friction treatments may be applied to the working surfaces of the structures of the present invention and/or to the surfaces of the components which rub against them. Suitable treatments include nitriding, boriding, cyaniding and coating or surface impregnation with materials such as molybdenum disilicide, graphite, Teflon, and aluminum oxide.

A related advantage is that the compliance of our novel structures remains high even in applications where changing temperatures or temperature differentials cause thermal expansion and/or contraction of the metallic assemblage which induces changes in the distances between the components sealed by the structure.

Another advantage of our invention is that a wide range of abradability and/or compliance or elasticity and a porosity[9] which ranges from almost zero up to a level sufficiently high to allow pumping to occur, or higher, can be provided by varying the configuration and/or the inclination of the corrugations, the positioning, width, and thickness of the foils, and by perforating the strips or foil, forming them from woven wires, replacing them in part with felted fiber members and the like.

[9] While undesirable for sealing components, increased porosity may be advantageous or even requisite for other applications of the invention.

Still another advantage of our invention flows from the availability of a wide variety of metallic foils, making it possible to fabricate structures having widely different physical characteristics. For example, many oxidation resistant metallic materials are available in foil form; from these can be fabricated structures for high temperature applications.[10] Also available are a number of heat treated or heat treatable materials which can be used when maximum resiliency and compliance is desired. Further, strips of two or more different types of materials can be readily employed in the same component to optimize it to a particular application.

[10] The structures of the present invention are of course far superior to those of felted or woven metal fibers because of the lower surface areas and comparably greater oxidation resistance due to the use of strips rather than fibers. For example, felted metal Hastelloy X seals are not usable at temperatures above 1200°F. Hastelloy sealing components in accord with the present invention can in contrast be used at temperatures up to 1800°F.

Yet another advantage of the invention is a result of the edgewise relationship of the foils to the support or backing member. Because of this relationship and the configurations of the interstices, the area to be joined between the strips and the backing member is minimized with a concurrent reduction in fabrication problems. At the same time the risk of distorting the component in the process of bonding the support or backing member to the foil is significantly reduced.

A further important advantage of our novel structures is that they can be made from materials which are difficult to form and to fabricate such as TD NiCr, Haynes 188, Fe-Al and Ni-Al alloys, and titanium. Similarly, perforated, notched, and other opened foils which can otherwise be handled only with difficulty and at high cost can be readily fabricated into structures embodying the principles of the present invention.

At the same time our novel structures can, in contrast to those of the honeycomb and comparable types, readily be fabricated in a variety of shapes such as flat, joggled or stepped, cylindrical (straight, tapered, etc.), oblate, conical, hourglass, convergent-divergent, and others.

Another important advantage of the same general character is that our novel materials can be readily shaped and/or formed to precise dimensions after fabrication by any one or a combination of a variety of techniques such as bending, rolling, sizing, coining, deep drawing, bulging, swaging, stretch forming, shear spinning, grinding, lapping, and the like.

A related advantage of the invention is that our novel structures can be formed by the foregoing and other techniques into configurations having very small radii or of very small diameters without deleterious anti-clastic effects. This attribute makes them useful as shaft seals and/or similar devices.

Yet another advantage of our invention is that in circumstances where a backing member is employed, a variety of techniques for attaching the backing member can be utilized. These include, but are not by any means limited to, welding, brazing (conventional and vapor phase), diffusion bonding, and the use of appropriate adhesives.[11,12]

[11] Similarly, backings of different thicknesses and materials and of perforate, bimetallic, and other character may be employed to best suit components in accord with the present invention for various applications.

[12] By selecting an appropriate method for attaching the backing member it can be made removable so that it or the porous structure can be removed and replaced as the replaceable component becomes unserviceable.

Still another advantage of the present invention is that structures fabricated in accord with the principles thereof are useful over a wide temperature range which varies from cryogenic temperature regions to 3000° Kelvin or higher. We are not aware of any other single type of sealing material, for example, which even remotely possesses this degree of versatility.

Yet another and of course highly important advantage of our invention is that structures having the various advantages described above are comparatively inexpensive. This stems in part from the design of our novel structures. In addition, the fact that the porous structure can be made by a continuous and simple wrapping operation also contributes to lower cost as well as the elimination or minimization of machining and other finishing operations which are usually necessitated when precision is required. Also, the weight to volume ratio of our novel structures is low. As a result, they generally require less material than honeycomb, felted metal, and other similar components.

As indicated previously, our novel metallic structures are further advantageous in that they are useful for many purposes other than those discussed above. Examples of applications for which they are particularly suited include insulation, sound attenuation, and reinforcement for other materials. They may also be fabricated as piston rings, slide valve seals, cryogenic bearings, seals, and valve members; our structures may also be used for still other purposes including screens, catalyst supports, diffusers and transpiration type heat exchange elements.

From the foregoing, it will be apparent that the primary object of the present invention resides in the provision of novel, improved, lightweight metallic structures.

A related and also important object of the invention is the provision of novel, improved metallic structures which are effective seals and are especially useful as rub rings for turbine and compressor sections and the like.

Another related and also important object is the provision of novel, improved metallic structures which are useful in a variety of applications embracing a wide range of temperatures and physical configurations and requiring a wide diversity of physical characteristics.

Other important but more specific objects of the present invention reside in the provision of novel, improved metallic structures or components:

1. which are porous, lightweight, strong, durable, and stable, and which can, at the same time, be made to be soft and resilient.
2. which are capable of minimizing wear on components having movement relative thereto in applications where they contact moving or movable components.
3. which are less expensive to fabricate than materials heretofore available for comparable applications.
4. to which backing or support members can be brazed or otherwise attached without filling the interstices between the strips with the braze or other metal employed in a liquid phase to produce the bond.
5. which can be fabricated in a variety of configurations and from a variety of materials capable of imparting a wide range of characteristics to the finished component including configurations and materials which can otherwise be produced and handled, if at all, only with difficulty and at high cost.
6. in which components of a variety of different configurations can be employed to impart a diversity of characteristics including a wide range of pore sizes and configurations and various degrees of resilience or compliance and abradability to the finished structure.
7. in which the degree of bonding between the metallic strips can be regulated or substantially eliminated.
8. which, in conjunction with the preceding object, have unbonded working surfaces.
9. which do not exhibit capillarity and are substantially free from convective gas current flows.
10. which, in conjunction with the preceding object, have a low density and are therefore good insulation materials.
11. which are usable over a wide temperature range from cryogenic temperatures to 3000° Kelvin or higher.
12. which are highly resistant to oxidation, even at elevated temperatures at which oxidation normally occurs.
13. which are substantially anti-clastic.
14. which can be filled with an abradable or other material to enhance, alter or provide additional properties and yet are highly effective in retaining the filler material in place.

15. which, when fabricated into rub rings or other gas sealing structures, are capable of substantially eliminating axial leakage and/or pumping.
16. which have a high degree of elasticity or resiliency or rub compliance and are therefore capable of expanding and otherwise changing in configuration to compensate for changing temperature conditions, misalignment in cooperating components, etc.
17. which, when employed as sealing components, are generally more efficient than the sealing materials heretofore available.
18. which can be fabricated in or formed by a variety of manufacturing processes to desired shapes and/or precise tolerances.
19. which can be formed into components having small diameters and radii without adversely effecting the characteristics of the structure.
20. in which the foil or strip assemblage and/or backing member is replaceable.
21. which can be surface treated and/or utilized in conjunction with surface treated components to reduce sliding or rubbing friction.
22. which are composed of a matrix of metallic foils or strips and a backing or support member or substrate attached to the matrix.
23. in which, in conjunction with the preceding object, the backing member can be attached by a variety of techniques including methods which will avoid any significant distortion of the component which would impair its functional capabilities.
24. in which, in conjunction with the two preceding objects, a variety of backings or different types can be employed to impart different characteristics to the final structural configuration.
25. which have various combinations of the foregoing attributes.

Other objects and features and additional advantages of the invention will become apparent from the appended claims and from the ensuing detailed description and discussion, taken in conjunction with the accompanying drawing, in which:

FIG. 1 is a generally schematic and fragmentary section through a turbine equipped with a rub ring fabricated in accord with the principles of the present invention.

FIG. 2 is a photograph of the rub ring;

FIG. 3 is a photograph of the same kind of structural material as that employed in the rub ring taken from a different angle;

FIG. 5 is a view showing how the foils employed in the structural material are corrugated and assembled;

FIGS. 6–13 are views similar to FIG. 5 of other embodiments of the invention;

FIG. 14 is a photograph of yet another embodiment of the invention; and

FIG. 15 is a view similar to FIG. 5 of an embodiment of the invention in which the foils of the structural members are spaced apart by woven metallic strips.

Figure 13:
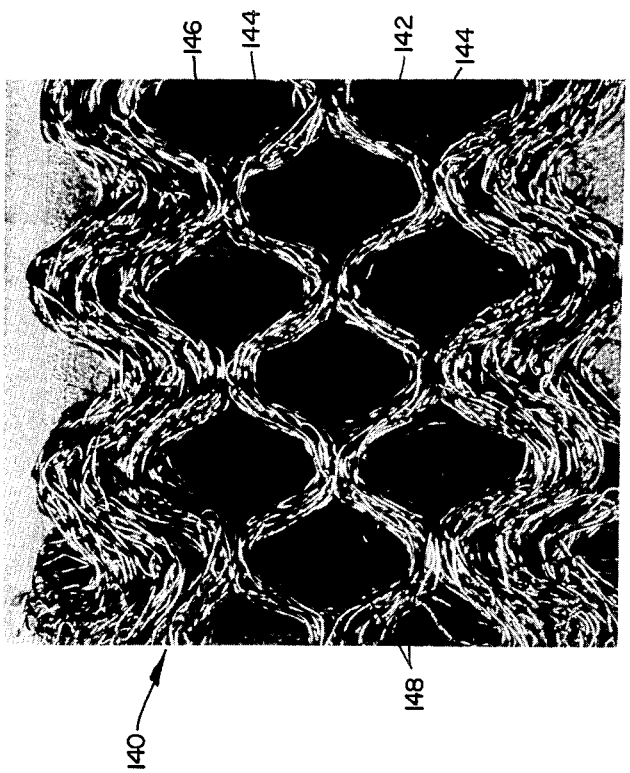

As discussed above, one of the applications in which the novel structural members of the present invention may be used to particular advantage is as a rub ring in a gas turbine. Such a turbine is shown in fragmentary form in FIG. 1 of the drawing and identified by reference character 10.

Turning now to FIG. 1, turbine engine 10 will typically include a compressor section (not shown) from which compressed air flows into a combustion section or cumbustor 12 where fuel is mixed with the compressed air and the fuel-air mixture ignited and burned. From the combustion section, the hot, compressed air-combustion products mixture flows through a nozzle section 14 into a turbine 16 which includes a wheel consisting of a plurality of turbine blades or buckets 18 fastened to a rotatably mounted shaft (not shown).

As the hot fluid impinges on the turbine buckets, it rotates the shaft of the turbine wheel, which is connected to the turbine engine compressor and may also be connected to load equipment such as a generator, propeller, or the like, and, in most cases, to auxiliary equipment. Alternatively, the turbine may be employed only to drive the compressor and auxiliary equipment and the hot exhaust gases directed through an appropriately configured nozzle section to increase their velocity energy and thereby produce forces capable of propelling an aircraft or other vehicle.

The energy available to do work decreases to the extent that the exhaust gases flow through the gap 19 between the tips of the turbine blades 18 and the casing 20 which houses the wheel 16.

For the reasons discussed previously, it is impossible to provide a zero clearance between the tips of turbine blades 18 and casing 20. Accordingly, to keep the hot gases discharged through nozzle 14 from flowing through gap 19, an annular rub ring 22 (see also FIG. 2) is disposed in the gap between the casing and turbine wheel.

Figure 4:
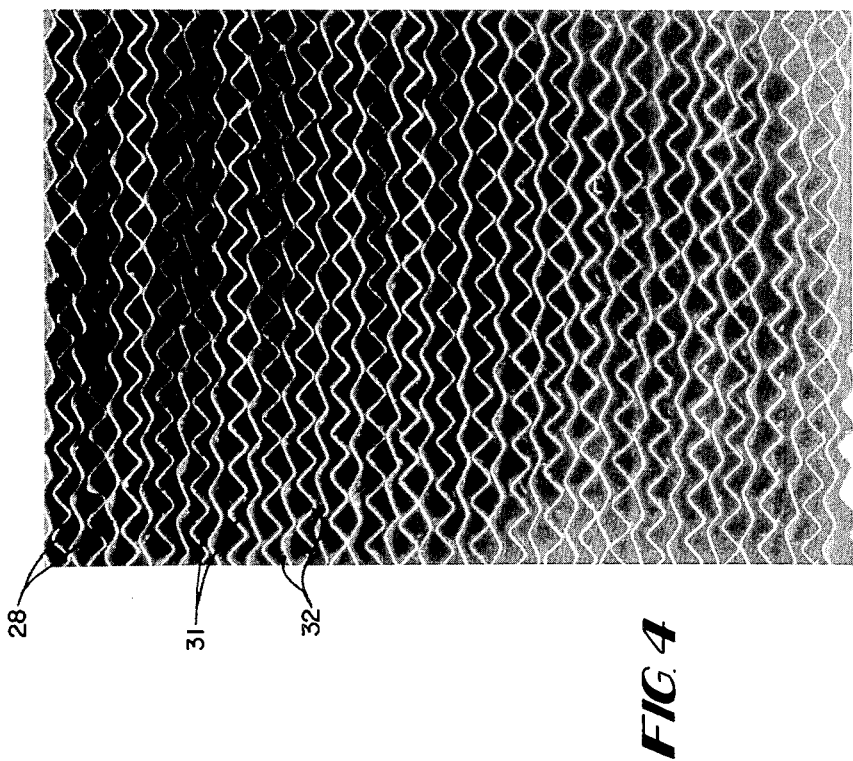
FIG. 4 is a close-up of the structural material.

Referring now to FIGS. 2–4, rub ring 22 includes a matrix 26 which consists of metal strips 28 disposed in side-by-side relationship with the edges of the strips at the opposite, inner and outer sides of the matrix. The matrix is surrounded by an annular backing or support member 30, which is typically fixed to the strips in matrix 26 as by brazing or by any of the other bonding techniques discussed above.

As best shown in FIGS. 2 and 4, there are interstices 31 between adjacent strips. The interstices are provided by corrugating strips 28 and then assembling them in a manner such that the corrugations in adjacent strips will come into contact at intervals therealong to space the strips apart form the interstices therebetween.

Any desired shape of corrugation may be employed as well as strips having combinations of different corrugation configurations, or corrugated and uncorrugated strips may be alternated as long as the strips are kept from nesting.

The specific corrugation arrangement employed in rub ring 22 is shown in more detail in FIG. 5. Referring now to this Figure, the corrugations 32 in strips 28 extend at an angle across the strips and from edge-to-edge thereof. The strips are assembled so that the corrugations 32 in adjacent strips are inclined in opposite directions. Thus the corrugations in the adjacent strips intersect in X-like patterns and space apart the adjacent strips to form the interstices 31 therebetween.

As shown in FIG. 5, none of the interstices 31 extend completely through matrix 26. Consequently, the bonding material by which backing or support member 30 is attached is confined to those edge portions of the strips nearest the support member, leaving the strips otherwise free to move relative to each other.

This provides maximum rub compliance between the strips and the tips of turbine buckets 18, permitting the edges of strips 28 facing wheel 16 to independently and elastically yield or deform to a virtual zero tolerance fit with the turbine blades as the wheel rotates.

The foil edges in the matrix are preferably oriented in the same direction as that in which wheel 16 rotates. Such orientation also increases the rub compliance of the sealing structure.

To further increase the rub compliance the corrugations, if of inclined character, are preferably oriented so that the corrugations are inclined in the direction of movement of the relatively movable component such as the turbine buckets 18.

The matrix of rub ring 22 may be made in any desired manner. For example, the foils 28 can be wound in side-by-side relationship on a rotating cylindrical mandrel. The facing or support member 30 is then bonded to the exposed side 34 of the matrix and the mandrel removed to complete the manufacturing process.

The dimensions of the strips will be varied, depending upon the use to which the structural member is to be put as will the diameters of the interstices 31, the thickness of the facing 30, the materials from which the facing and strips are formed, etc. Typically, however, the distance between the two edges 34 and 36 of the matrix will range from 0.05 to 1.00 inch; and the interstices will range from 0.005 to 0.250 inch in diameter.

The strips will typically be formed of 0.0005 to 0.010 inch thick sheet material and will be somewhat thicker if made from a knitted or woven material.

Both the strips 28 and the support member 30 can be made from a variety of metals, depending upon the use to which the member is to be put. For high temperature applications, these include Hastelloy X and oxidation resistant alloys of the iron-chromium-aluminum and cobalt-chromium-aluminum-yttrium types.

If maximum elasticity is of importance, heat treatable alloys such as the aluminum based 7075, 7178, and 2024 alloys; beryllium copper and beryllium nickel alloys; nickel and iron-based alloys such as Inconel-X750, 718, and A-286; and titanium-aluminum-vanadium alloys can be utilized.

Other exemplary metals from which the strips can be made include silver and tungsten and their alloys.

The strips can also be molded from refractories such as alumina and thoria which can be filled with fibers or other reinforcements if desired.

Still other variations which may be employed are to make the strips of bimetallic or composite metallic-metallic or metallic-non-metallic materials. They may also be coated to change their characteristics.

The cell size will also depend upon the application or use of the structural member. In sealing applications such as that illustrated in FIG. 1, the interstices can readily be made small enough that the turbine blades will "see" the matrix of the seal as a solid surface. In this circumstance, there will be essentially no leadkage of gases past the tips of the turbine blades.

Again, depending upon the particular characteristics wanted in the structural member, the interstices 31 between strips 28 may be left unfilled. Or they may be filled with a variety of abradable materials (for example, Teflon, polyimides, graphites, boron nitrides, ceramics, metals, and various combinations of the foregoing).

The backing or support member employed in the structures we have invented can also vary considerably in character. Although it can obviously be of any thickness, the support member will typically, thought not necessarily, be from 0.0002 to 0.010 inch thick. It can be smooth and imperforate as shown in FIG. 2, or it can be of embossed, perforated, expanded, or other material depending upon the application of the invention. It can also be made from a wide variety of materials as just discussed, depending upon the intended use of the structure.

The support member can, in some applications, be omitted altogether. In this case the strips will be bonded together at one side of the matrix to keep the strips in the proper relationship.

It is to be remembered that the annular configuration of rub ring 22 is but one of the many shapes which the structural members of the present invention may have. Other exemplary shapes and techniques by which they can be made were identified above.

Also, the member can be treated after it is assembled to alter its characteristics if the intended application so dictates. For example, it may be desirable to minimize the tendency of the member to gall and/or to reduce its coefficient of friction.

Examples of post-fabrication treatments include nitriding, coating, etc.

Returning now to the drawing, FIGS. 6–14 illustrate other typical structural members in accord with the principles of the present invention. Structurally, these members differ from rub ring 22 primarily in the manner in which the strips of the structural member matrix are corrugated.

Thus the matrix 39 of the structural member 40 shown in FIG. 6 (which also includes substrate or support member 41) consists of strips 42 with inclined corrugations 44 alternated with foils 46 in which the corrugations 48 extend normally across the strip. This arrangement is also anti-nesting, and it provides interstices 50 between adjacent strips.

In the matrix 51 of the structural member 52 shown in FIG. 7, strips 54 with inclined corrugations 56 are alternated with foils or strips 58 which also have inclined corrugations, 60. In this matrix, corrugations 60 extend in the same direction as corrugations 56. However, corrugations 60 are less steeply inclined than corrugations 56, again providing a strip assemblage which is anti-nesting and which provides interstices 62 between the strips.

Still yet another exemplary structural member 64 is shown in FIG. 8. In the matrix 65 of this member, strips 66 having chevron shaped configurations 68 are alternated with strips 70 having inclined corrugations 72. This anti-nesting arrangement provides interstices 74 between adjacent strips.

In the matrix 80 of the structural member 81 illustrated in FIG. 9, the strips or foils 82 have arcuate or curved corrugations 84. The strips are assembled so that the corrugations 84 of adjacent foils face in the opposite direction. This, again, keeps adjacent foils from nesting and provides interstices 86 between the foils.

FIG. 10 depicts a structural member 90 in accordance with the principles of the present invention, which is particularly useful in rub ring and similar applications. This structural member includes a matrix 92 of metallic strips 94. At one side 96 of the matrix, the strips are bonded to a support or backing member 98 of the type previously described.

Each of the strips 94 in matrix 92 has corrugations which are inclined at the side of the matrix to which the backing strip 98 is attached. The corrugations also have a portion 104 extending normally across the strips from the associated inclined portion 105 to the opposite side 106 of the matrix.

Alternate strips 94 are assembled with the inclined portions 105 of the corrugations facing in opposite directions. As in the preceding exemplary embodiments of the invention, this produces a non-nesting structure with interstices 107 between the strips.

The structural member 108 of FIG. 11 is similar to structural member 90 except that each of the strips 110 in the matrix 112 to which backing member 114 is attached has corrugations 115 in which two end portions 116 and 118 facing in opposite directions to provide a non-nesting arrangement with interstices 122 between the strips.

The matrix 126 of the structural member 127 shown in FIG. 12 again illustrates how strips of two different types can be employed in the same matrix. In matrix 126 strips 128 with chevron shaped corrugations 129 are alternated with strips 130 having corrugations 132 extending normally across the strips, producing a non-nesting arrangement with interstices 133.

In one structural member employing a matrix of the type illustrated in FIG. 12, the distance between the two sides 134 and 136 of the matrix was 0.10 inch nominal. There were 40 corrugations per inch in strips 130 and 20 corrugations per inch in the chevron corrugated strips 128.

As indicated previously, the foils or strips employed in the structural members of the present invention may be made from knitted and/or woven metallic tapes and the like. FIG. 13 illustrates a structural member of this character.

More specifically, the structural member 140 illustrated in FIG. 13 includes a matrix 142 of corrugated tapes 144 to which support member 146 is attached. Tapes 144 were woven from strands of Inconel 600 and then deformed into a generally sinusoidal configuration, providing corrugations extending normally across the strips.

As can be seen from FIG. 13, the strips are nonnesting and assembled; and there are interstices 148 between the strips.

As was pointed out previously, the properties of structural members in accord with the present invention can also be altered by perforating the foils from which the structural member is made. A typical example of a perforated foil is shown in FIG. 14 and identified by reference character 152. Foil 152 is substantially identical to the foil 46 illustrated in FIG. 6 and described above except that perforations 154 are formed in the foil at intervals therealong.

A structural member employing foils are illustrated in FIG. 14 would be lighter and would tend to have greater rub compliance than the structural member depicted in FIG. 6.

Other strips of a perforated, slotted or otherwise "opened" character made by notching the strips, fabricating them from expanded metal, etc., would, of course, further alter and/or change these characteristics of the structural member.

We also pointed out previously that the interstices between the strip can be formed by alternating appropriate spacers with the strips instead of or in addition to corrugating the strips. A member 160 of this character is illustrated in FIG. 15. The matrix 162 of the member is made of un-corrugated foils 163 alternated with woven strips 164 which space foils 163 apart and divide the spaces therebetween into cells of a size determined by the thickness of the strands from which the strips are woven, the tightness of the weave, etc.

The structural member 160 of FIG. 15 also includes two support members 166 and 168, one being fixed to each side of matrix 162. As mentioned above, this is another variation which can be employed to advantage in certain applications of the invention.

It will be apparent from the foregoing that there are countless forms of metallic foils or strips and combinations thereof which can be employed in the practice of the present invention. It is to be understood, therefore, that the embodiments of the invention hereinbefore described are intended to be merely illustrative only and not inclusive, inasmuch as many alternate arrangements which will prevent nesting and provide interstices between the strips can be employed.

From the foregoing illustrations of various embodiments of the present invention, it will be apparent that the invention may be embodied in other specific forms without departing from the spirit or essential characteristics thereof. The present embodiments are therefore to be considered in all respects as illustrative and not restrictive, the scope of the invention being indicated by the appended claims rather than by the foregoing description; and all changes which come within the meaning and range of equivalency of the claims are therefore intended to be embraced therein.

What is claimed and desired to be secured by Letters Patent is:

1. A stable, lightweight, porous member of composite construction comprising an assemblage of unconnected metal strips disposed in abutted, side-by-side relationship with the edges of the strips at opposite sides of the assemblage; means between or formed in said strips for providing interstices therebetween; and means at one side of the assemblage for maintaining the strips in the assemblage in the aforesaid relationship comprising a rigid backing member, said backing member being bonded only to the edge portions of the strips at said one side of the assemblage so that said strips are otherwise free to move relative to each other, and the edges of the strips at the opposite side of the assemblage being exposed.

2. The member of claim 1, wherein the means for forming interstices between said strips are corrugations formed in at least part of the strips.

3. The member of claim 2, wherein all of said strips are corrugated with the corrugations extending diagonally from edge-to-edge of each said strip, the corrugations in alternate strips extending in opposite directions, whereby the corrugations in adjacent strips come into contact to space the strips apart and provide the interstices therebetween.

4. The member of claim 2, wherein all of said strips are corrugated with the corrugations extending diagonally from edge-to-edge of each strip, the corrugations in all of said strips extending in the same direction and the corrugations in adjacent strips being inclined at different angles relative to the edges of the strips, whereby the corrugations in adjacent strips come into contact to space the strips apart and provide the interstices therebetween.

5. The member of claim 2, wherein the corrugations in at least alternate strips are V-shaped, said corrugations spacing said strips apart and thereby providing the interstices therebetween.

6. The member of claim 2, wherein only alternative ones of said strips are corrugated.

7. The member of claim 2, wherein the corrugations in the strips are of at least two different configurations.

8. The member of claim 2, wherein the corrugations in adjacent strips are in a mirror image relationship relative to the corrugations in the strips thereadjacent.

9. The member of claim 2, wherein the corrugations in said strips have an arcuate configuration.

10. The member of claim 9, wherein the corrugations in adjacent strips face in opposite directions.

11. The member of claim 1, wherein the means spacing apart the strips are members of woven or felted strands disposed between the strips.

12. The member of claim 1, wherein said strips are composed of at least two different metallic materials.

13. The member of claim 1, wherein at least part of the strips are of knitted or woven metallic fibers.

14. The member of claim 1, together with an abradable filler in the interstices between the strips of the assemblage.

15. The member of claim 1, wherein said strips are of a heat treatable metal or alloy which is or contains aluminum, beryllium, copper, nickel, titanium, iron, chromium, cobalt, silver, tungsten, and/or molybdenum.

16. The member of claim 1, wherein at least part of the strips in the assemblage are of perforated, notched, or other open construction.

17. The member of claim 1, wherein said strips have a thickness in the range of from 0.0005 to 0.010 inch.

18. The member of claim 18, wherein said backing member has a thickness in the range of from 0.002 to 0.010 inch.

19. The member of claim 1, wherein said assemblage has a thickness of from 0.05 to 1.0 inch.

20. The member of claim 1, wherein the size of the interstices between the strips is in the range of 0.005 to 0.250 inch.

21. A stable, lightweight, porous member of composite construction comprising an assemblage of unconnected metal strips disposed in abutted, side-by-side relationship with the edges of the strips at opposite sides of the assemblage, at least alternate ones of said strips being corrugated to space said strips apart and thereby provide interstices between the strips, and means at one side of the assemblage for maintaining the strips in the assemblage in the aforesaid relationship comprising a rigid backing member, said blocking member being bonded only to the edge portions of the strips at said one side of the assemblage so that said strips are otherwise free to move relative to each other, and the edges of the strips at the opposite side of the assemblage being exposed.

22. A stable, lightweight, porous member of composite construction comprising an assemblage of unconnected metal strips disposed in abutted, side-by-side relationship with the edges of the strips at opposite sides of the assemblage; means between or formed in said strips for providing interstices therebetween; and means for maintaining the strips in the assemblage in the aforesaid relationship comprising a rigid backing member on each side of the assemblage of strips, each said backing member being bonded only to the edge portions of the strips at the side of the assemblage at which the backing member is located so that said strips are otherwise free to move relative to each other.

23. A stable, lightweight, porous member of composite construction comprising an assemblage of unconnected metal strips disposed in abutted, side-by-side relationship with the edges of the strips at opposite sides of the assemblage and means between or formed in said strips for providing interstices therebetween, the edge portions only of said strips being bonded together at one side of the assemblage so that said strips are otherwise free to move relative to each other, and the edges of the strips at both sides of the assemblage being exposed.

* * * * *

UNITED STATES PATENT OFFICE
CERTIFICATE OF CORRECTION

PATENT NO. : 3,916,054
DATED : October 28, 1975
INVENTOR(S) : John V. Long et al It is certified that error appears in the above-identified patent and that said Letters Patent are hereby corrected as shown below:

Column 8, line 46, after "apart" add --and--.

Column 10, line 4, change "thought" to -- through --.

Column 11, line 18, after "118" insert --on opposite sides of a normally extending portion 120--.

Column 11, line 18, change "facing" to --face--.

Column 11, line 47, change "and" to --as--.

Column 12, line 53 (claim 2, line 2), change "forming" to --providing--.

Column 13, line 19 (Claim 11, line 1), after "means" insert --providing said interstices are means--.

Column 13, line 20 (Claim 11, line 2), cancel "are"; insert --said last mentioned means being--.

Column 13, line 39 (Claim 18, line 1), change "18" to --1--.

Column 14, line 13 (Claim 21, line 10), change "blocking" to --backing--.

Signed and Sealed this eighteenth Day of May 1976

[SEAL]

Attest:

RUTH C. MASON
Attesting Officer

C. MARSHALL DANN
Commissioner of Patents and Trademarks